United States Patent [19]

Shimizu

[11] 4,423,302
[45] Dec. 27, 1983

[54] DIGITAL DRIVE APPARATUS FOR EFFECTING CONTROL DISPLACEMENTS IN AN ELECTROEROSIVE MACHINE TOOL

[75] Inventor: Akihiko Shimizu, Kawasaki, Japan

[73] Assignee: Inoue-Japax Research Incorporated, Yokohama, Japan

[21] Appl. No.: 246,415

[22] Filed: Mar. 23, 1981

[30] Foreign Application Priority Data

Mar. 27, 1980 [JP] Japan .................................. 55-38238

[51] Int. Cl.$^3$ .............................................. B23P 1/12
[52] U.S. Cl. ................................. 219/69 G; 219/69 E
[58] Field of Search ................ 219/69 G, 69 C, 69 R, 219/68, 69 E

[56] References Cited

U.S. PATENT DOCUMENTS

| | | | |
|---|---|---|---|
| 2,807,706 | 9/1957 | Oezer | 219/69 G |
| 3,125,700 | 3/1964 | Bentley et al. | 219/69 G |
| 3,657,507 | 4/1972 | McNeece | 219/69 G |
| 4,263,494 | 4/1981 | Martin | 219/69 G |

FOREIGN PATENT DOCUMENTS 2711697  9/1978  Fed. Rep. of Germany ... 219/69 G

Primary Examiner—M. H. Paschall
Attorney, Agent, or Firm—Karl F. Ross; Herbert Dubno

[57] ABSTRACT

A drive apparatus for effecting controlled displacement of a movable electrode relative to a counterelectrode along a predetermined axis in an electroerosive machine tool makes use of a feed screw and a feed nut which meshes therewith. The feed screw is rotatably carried by a fixed member, e.g. arm or column, in the machine tool and rotatable about the predetermined axis. The feed nut is rotatably carried by an axial electrode support which is slidably carried by the fixed member. A first unidirectionally rotatable motor drivingly coupled to one of the feed screw and the feed nut is energized by a train of drive pulses of variable frequency for incrementally rotating the feed screw or the feed nut to incrementally advance the electrode support along the predetermined axis in a first direction such as to move the movable electrode towards the counterelectrode. A second unidirectionally rotatable motor drivingly coupled to the nut or screw is energized with a fixed power supply or a train of drive pulses of a fixed frequency for rotating it to retract the electrode support. With the two motors simultaneously energized in the manner described, the controlled displacement of the movable electrode is effected with a minimum influence of inertia and backlash of the mechanical system and with an extremely high speed of response and positioning precision.

6 Claims, 2 Drawing Figures

DIGITAL DRIVE APPARATUS FOR EFFECTING CONTROL DISPLACEMENTS IN AN ELECTROEROSIVE MACHINE TOOL

FIELD OF THE INVENTION

The present invention relates generally to a drive apparatus for effecting controlled displacement of an electrode in an electroerosive machine tool. The term "electroerosive machine tool" is intended herein to refer to a machine tool designed to execute electrical machining and electrical discharge machining, in particular. Electrical machining or EM refers to the general field of machining in which electricity is applied directly for the actual eroding of a workpiece to form a shape in this electrically conductive workpiece. Examples of electrical machining are electrical discharge machining, electrochemical machining and electrochemical-discharge machining. Electrical discharge machining, commonly referred to in the art as EDM is carried out by passing a succession of discrete, localized electrical discharges across a gap between a tool electrode and a workpiece electrode in the presence of a dielectric liquid for eroding the workpiece electrode.

BACKGROUND OF THE INVENTION

In electrical machining and electrical discharge machining in particular, the machine tool must sometimes carry a tool or workpiece electrode which is large in weight and size. When such an electrode is moved to progressively form a desired shape complimentary to the shape of the tool electrode in the workpiece, it is desired that a drive system for effecting this movement be capable of converting an input electrical drive signal into a corresponding mechanical displacement with precision and speed.

Fluid actuated servo feed systems have been recognized to entail errors in the machining operation due to the inertia inherently encountered by movable parts including the electrode and are now being increasingly replaced by digital servo systems operated with a stepping motor which assure a given servo feed with greater precision.

While the digital servo system can advantageously perform a desired electrode positioning with ease and allow precise ascertainment of a given electrode position, it has generally been recognized to be disadvantageous for use with a movable electrode which is large in weight and size because then not only is an expensive high-rating servo motor required but it still lacks a satisfactory operating stability. It has been proposed to provide the machining feed with a mechanical counterbalance but it has been found that this generally increases the inertia of the movable parts and substantially reduces the speed of operating in response to an input drive signal.

OBJECTS OF THE INVENTION

It is a principal object of the present invention to provide a new and useful drive apparatus operable with an electroerosive machine tool for effecting controlled displacement of a movable electrode which is relatively large in weight and size.

Another object of the invention is to provide an improved drive apparatus for effecting controlled displacement of a movable electrode in an electroerosive machine tool, which apparatus is simple in structure and relatively inexpensive and yet assures an extremely high operating response speed and accuracy.

SUMMARY OF THE INVENTION

In accordance with the present invention, there is provided a drive apparatus for effecting controlled movements of a movable electrode relative to a counterelectrode along a predetermined axis in an electroerosive machine tool, which apparatus comprises: an axial electrode support for securely carrying the movable electrode, the axial support being slidably carried by a fixed member (e.g. arm or column) of the machine tool so as to be movable along the predetermined axis; a feed screw rotatably carried by the fixed member for rotation about the predetermined axis; a feed nut rotatably carried by the electrode support and coupled in engagement with the feed screw; a first unidirectionally rotatable motor drivingly coupled with one of the feed screw and the feed nut and energizable with a train of drive pulses for incrementally rotating the one of the feed screw and feed nut to incrementally drive the axial electrode support along the predetermined axis in a first direction such as to move the movable electrode towards the counterelectrode; a second unidirectionally rotatable motor drivingly coupled to the other of the feed screw and the feed nut and energizable with a drive power for rotating the other of the feed screw and the feed nut to drive the axial electrode support along the predetermined axis in a second direction such as to move the movable electrode away from the counterelectrode. Advantageously, there is provided control circuit means for simultaneously furnishing the train of drive pulses and the drive power to the first and second unidirectionally rotatable motors, respectively, whereby to achieve each of the controlled movements of the movable electrode relative to the counterelectrode.

Specifically, the control circuit means includes a first driver circuit for furnishing the first motor with the train of drive pulses of variable mean magnitude and a second driver circuit for furnishing the second motor with the drive power of a constant mean magnitude. Preferably, the first driver circuit comprises a first oscillator circuit for providing the train of drive pulses of variable frequency and the second driver circuit comprises a second oscillator circuit for providing a second train of drive pulses of a fixed frequency constituting the drive power. Typically, the control circuit means includes a servo-control circuit responsive to a condition in the electroerosive machining gap between the electrodes for controlling the frequency of the first oscillator. The apparatus preferably also includes further up/down counter means responsive to the outputs of the first and second oscillators for ascertaining the position of the movable electrode relative to the counterelectrode and display means for numerically displaying the position ascertained.

BRIEF DESCRIPTION OF DRAWING

These and other objects, features and advantages of the present invention will become more readily apparent from the description which follows as taken with reference to the accompanying drawing in which.

SPECIFIC DESCRIPTION

Figure 1:
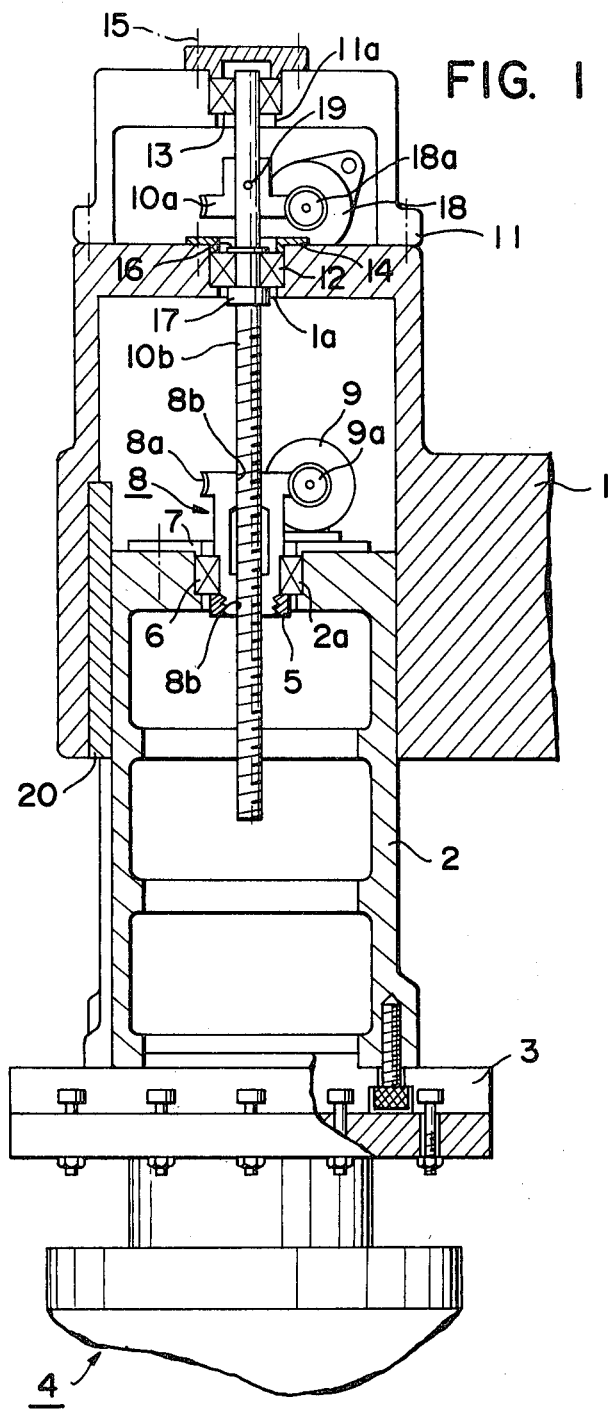
FIG. 1 is an elevational view partly in section diagrammatically illustrating the structure of a drive apparatus according to the invention.

Referring first to FIG. 1, numeral 1 designates an arm or column (hereinafter referred to as "arm") as is commonly provided in an electroerosive machine tool. The arm 1 is used in this embodiment as a fixed member by which an axial electrode support 2 is slidably carried so as to be movable along a vertical axis. The lower end of the support 2 is constituted by a flange member 3 to which a tool electrode 4 is securely mounted or clamped. The electrode support 2 is of inverted cup-shaped having a top opening 2a in which a bearing nut 5 is secured supporting a bearing 6 which is held by a retainer ring 7. A feed nut 8 is rotatably carried by the bearing 6 so as to be rotatable but held against axial displacement relative to the supporting electrode support 2 and is rotated by a unidirectionally rotatable motor 9 securely mounted on the electrode support 2. The feed nut 8 may as shown have a worm wheel 8a in engagement with a worm gear 9a of the motor 9. The feed nut 8 has also a female screw portion 8b into which a feed screw 10 is threaded in engagement therewith. The feed screw 10 is shown extending through a top opening 1a of the arm 1 and through a top opening 11a in a cup-shaped cover 11 securely mounted on the arm 1 and is rotatably supported on or journaled by bearings 12 and 13 secured in the openings 1a and 11a, respectively and held in position by a retainer ring 14 and a retainer disk 15, respectively. The feed screw 10 is held against axial or vertical displacement by a pair of rings 16 and 17 secured thereon in sliding contact with the bearing 12 on its opposite sides. The feed screw 10 is rotated by a unidirectionally rotatable motor 18 securely mounted on the top region of the arm 1 and accommodated within the top cover 11. The feed screw 10 may as shown have a worm wheel 10a secured thereto by a pin 19 and in engagement with a worm gear 18a of the motor 18. To hold the electrode support 2 against rotation relative to the arm 1, a slide guide element 20 is formed along a portion of their bearing surfaces.

Specifications of the worm wheel 8a and the worm gear 9a which meshes therewith are preferably identical to those of the worm wheel 10a and the worm gear 18a which meshes therewith. The directions of rotation of the motors 9 and 18 are made and the worm wheel 10a and the worm gear 18a and the worm wheel 8a and the worm gear 9a are threaded such that the rotation of one of the motors 9 and 18 causes the electrode support 2 to move downwardly whereas the rotation of the other of the motors 9 and 18 causes the electrode support 2 to move upwardly. For example, the motor 18 may be rotated to cause a rotation of the feed screw 10 which in turn causes, via the feed nut 8, an upward movement of the electrode support 2. The motor 9 may be rotated to cause a rotation of the feed nut 8 which in turn causes, via the feed screw 10, a downward movement of the electrode support 2. In accordance with the present invention, it is extremely advantageous that at least the one of the motors 9 and 18, here the first, which serves to cause the downward displacement of the electrode support 2, should be rotated incrementally or stepwise, that is in a succession of uniform steps. In this case, when the motor 9 is rotated incrementally and the motor 18 is rotated either incrementally or continuously, and the two motors 9 and 18 are rotated at an equal rate of rotation, the electrode support 2 will not move either upwards or downwards and will remain at standstill because the two rotations cancel each other at the interface between the feed screw 10 and the feed nut 8 meshed together. If, however, there develops a difference in the rate of rotation between the motors 9 and 18, the feed nut 8 will rotate relative to the feed screw 10 and the electrode support 2 will be caused to move incrementally downwards, or incrementally or continuously upwards, depending upon the sign of the difference.

In this manner, it becomes possible to retract the electrode 4 at a high speed of response against a large load weight and to make a follow-up feed in the machining advance direction at a high speed of response. The motors 9 and 18 (the former, in particular) should be a pulse motor or a DC motor equipped with an encoder. By setting each increment of displacement to be sufficiently small, it is possible to reduce the inertia effects to a very small level and achieve an extremely stable gap follow-up control without producing short-circuiting conditions which may occur due to an unintentional overtravel.

Throughout their overall upward and downward travels, the motors, gears and screw and nut in each set are codirectional in their rotation. Accordingly, there will be produced no error due to backlash when the direction of movement of the electrode is reversed. Furthermore, it is possible to provide a gear reduction of a high ratio between the motor 9, 18 associated feed nut 8 or feed screw 10. Accordingly, each of the motors 9 and 18 can be of a small size and high-velocity type. This provides extremely rapid-response and subtle-control capabilities.

Figure 2:
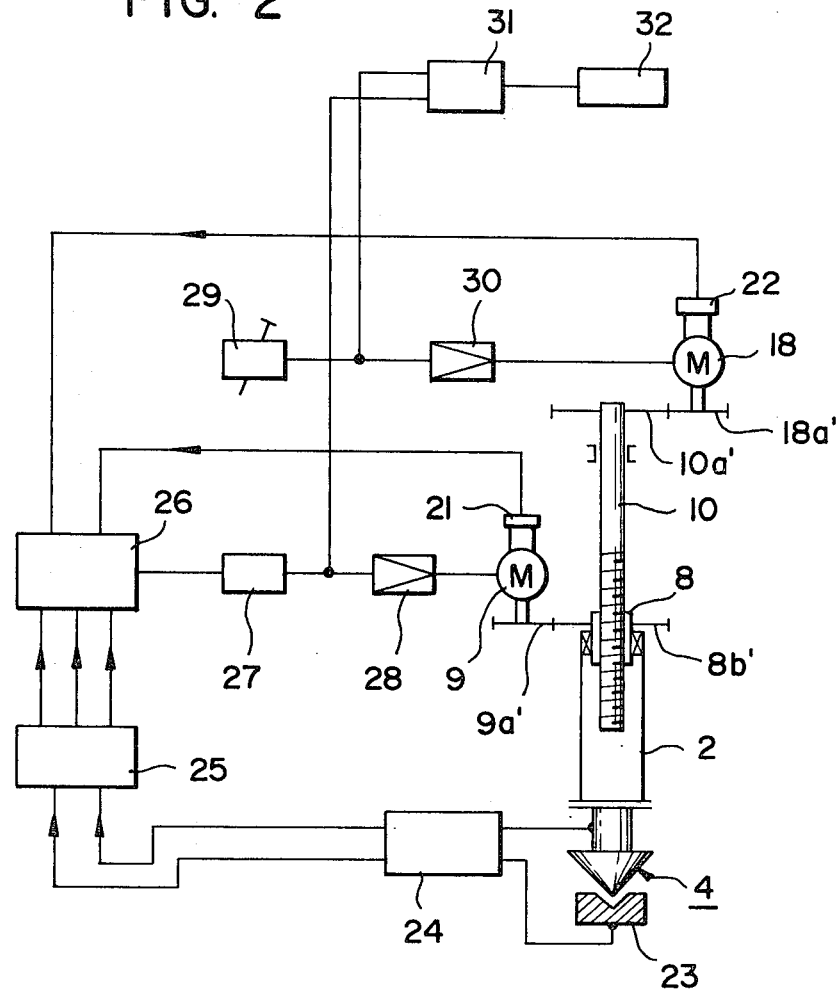
FIG. 2 is a schematic diagram of a motor driver circuit means of an embodiment of the invention.

A preferred form of the control circuit for use with the drive apparatus according to the invention is shown in FIG. 2. In this embodiment, the motor 9 is shown drivingly coupled to the feed nut 8 via spur gears 9a' and 8b' and the motor 18 to the feed screw 10 via spur gears 18a' and 10a'. These spur gears in each coupling correspond to the worm gear 9a, 18a and the worm wheel 8b, 10a in the embodiment of FIG. 1. Further, the motors 9 and 18 are shown equipped with encoders 21 and 22, respectively. The tool electrode 4 is shown juxtaposed with a workpiece electrode 23 to maintain the gap spacing defined therebetween to be substantially constant in size and to be in an optimum discharge condition by effecting controlled movements with the apparatus of the invention. To this end, a gap sensing circuit 24 is connected to the tool electrode 4 and the workpiece electrode 23 and feeds into a monitoring circuit 25. The latter in turn feeds into a servo-control circuit 26 which has an oscillator of variable frequency 27 whose output is fed via an amplifier 28 to the motor 9. The output of the encoder 21 for the latter is returned to the servo-control circuit 26. The motor 18 is shown energized by an oscillator 29 having variable frequency setting via an amplifier 30 and the output of the encoder 22 is returned to the servo-control circuit 26. An up-/down or reversible counter 31 is connected to the outputs of the oscillators 27 and 29 to ascertain the position of the tool electrode 4. A display 32 is connected to the up/down counter 31 for numerically displaying the position ascertained.

The monitoring circuit 25 responds to the gap sensor 24 and determines if the discharge condition in the machining gap is satisfactory. When the material removal is found to proceed in a normal mode, the monitoring circuit 25 issues a command signal of a first class which is transmitted to the servo circuit 26 to allow the tool electrode 4 to be advanced in a normall follow-up mode. When the machining gap is found to have been contaminated with machining products and thus requires an intense corrective action, the monitoring circuit 25 issues a command signal of a second class which is transmitted to the servo circuit 26 to allow the tool electrode 4 to be retracted or reciprocated. The motors 18 and 9 are here both pulse or stepping motors and are driven by output pulses of the oscillators 29 and 27. The motor 18 is fed with pulses of a fixed frequency and thereby rotates at a fixed rate of rotation to cause the feed screw 10 to incrementally rotate at a fixed rate. The motor 9 is fed with pulses of the frequency which is variably determined by the servo circuit 26 in accordance with the gap condition ascertained and is reflected in the controlled rate of rotation of the feed nut 8. Thus, in a normal machining mode, the motor 9 or the feed nut 8 rotates at a speed greater, by a variable amount, than the speed at which the motor 18 or the feed screw 10 rotates. As a result, the tool electrode descends at a rate proportional to this variable amount. In a tool retraction or reciprocation mode, the frequency of the oscillator 27 is first largely reduced to reduce the speed of the motor 9 thereby allowing the tool electrode 4 to be swiftly withdrawn and then is largely increased to exceed the fixed frequency of the oscillator 29 thereby causing swift return of the tool electrode 4 to a position proximate to the workpiece 23.

There is thus provided, in accordance with the present invention, an improved drive apparatus for effecting controlled movements of a movable electrode relative to a counterelectrode along a predetermined axis in an electroerosive machine tool, the apparatus advantageously permitting the use of motors of an extremely small rating and providing an extremely high-speed response and subtle control servo capability with practically no adverse influence from backlash and inertia of the mechanical system.

What is claimed is:

1. A drive apparatus for effecting controlled movements of a movable electrode relative to a counterelectrode along a predetermined axis in an electroerosive machine tool, the apparatus comprising:
   a fixed member of the machine tool;
   an axial electrode support for securely supporting said movable electrode, said support being slidably carried by said fixed member so as to be movable longitudinally along said axis in a first direction to advance said movable electrode towards said counterelectrode and in a second direction to retract said movable electrode away from said counterelectrode;
   a feed screw rotatably carried by said fixed member for rotation about said axis;
   means for holding said feed screw while in rotation against longitudinal displacement relative to said fixed member;
   a feed nut coupled in mating engagement with said feed screw and rotatably carried by said axial electrode support for rotation about said axis;
   means for holding said feed nut while in rotation against longitudinal displacement relative to said axial electrode support;
   a first unidirectionally rotatable motor drivingly coupled to one of said feed screw and said feed nut, constituting a first rotational drive member;
   a second unidirectionally rotatable motor drivingly connected to the other of said feed screw and said feed nut, constituting a second rotational drive member in mating engagement with said first rotational drive member;
   a first driver circuit for energizing said first motor with a train of drive pulses to substantially incrementally rotate said first rotational drive member in a predetermined rotary direction, thereby to substantially incrementally move said axial electrode support in said first direction along said predetermined axis; and
   a second driver circuit for energizing said second motor with a drive power to rotate said second rotational drive member in said rotary direction, thereby to move said axial electrode support in said second direction along said predetermined axis.

2. The apparatus defined in claim 1 wherein said first driver circuit comprises a first oscillator circuit for furnishing said train of drive pulses of variable frequency and said second driver circuit comprises a second oscillator circuit for furnishing a second train of drive pulses of a fixed frequency constituting said drive power.

3. The apparatus defined in claim 2, further comprising up/down counter means responsive to the outputs of said first and second oscillators for ascertaining the position of said movable electrode and display means for numerically displaying said position.

4. The apparatus defined in claim 1, further comprising: control circuit means for simultaneously furnishing said train of drive pulses and said drive power to said first and second motors, respectively, whereby to achieve each of said controlled movements of said movable electrode relative to said counterelectrode.

5. The apparatus defined in claim 4 wherein said driver circuits are so arranged that said drive power furnished therefrom to said second unidirectional motor is of a constant magnitude.

6. The apparatus defined in claim 2, further comprising a servo-control circuit responsive to a condition in the electroerosive machining gap between said electrodes for controlling the variable frequency of said first circuit.

* * * * *